United States Patent
Gilg et al.

(10) Patent No.: US 7,920,995 B2
(45) Date of Patent: Apr. 5, 2011

(54) PROBABILISTIC DESIGN TOOL FOR OPTIMIZING A TECHNICAL SYSTEM

(75) Inventors: Albert Gilg, Kaufering (DE); Francesco Montrone, Riemerling (DE); Meinhard Paffrath, Feldkirchen (DE); Utz Wever, München (DE)

(73) Assignee: Siemens Aktiengesellschaft, Munich (DE)

( * ) Notice: Subject to any disclaimer, the term of this patent is extended or adjusted under 35 U.S.C. 154(b) by 588 days.

(21) Appl. No.: 11/988,102

(22) PCT Filed: May 5, 2006

(86) PCT No.: PCT/EP2006/062099
§ 371 (c)(1),
(2), (4) Date: Dec. 31, 2007

(87) PCT Pub. No.: WO2007/000366
PCT Pub. Date: Jan. 4, 2007

(65) Prior Publication Data
US 2009/0112534 A1    Apr. 30, 2009

(30) Foreign Application Priority Data
Jun. 29, 2005  (EP) .................................... 05105786

(51) Int. Cl.
*G06F 7/60* (2006.01)
(52) U.S. Cl. .......................................................... 703/2
(58) Field of Classification Search ........................ 703/2
See application file for complete search history.

(56) References Cited

U.S. PATENT DOCUMENTS
2002/0062212 A1 *  5/2002  Nakatsuka .................... 704/240
2004/0059621 A1 *  3/2004  Jameson ........................... 705/8

FOREIGN PATENT DOCUMENTS
DE        103 08 314 A1      9/2004

OTHER PUBLICATIONS

Khoukhi, Recursive and optimal multi-level algorithms for the identification of stochastic systems applications to bipeds control and identification, Sep. 2001, Micromechatronics and Human Science, 2001. MHS 2001. Proceedings of 2001 International Symposium, pp. 169-174.*

Standard Formulary for Physics; (Formula Symbols, Units, Short Symbols and Correlation); Verlag Harri Deutsch, Thun und Frankfurt/Main, 1985, chapter 3. pp. 39-50.

* cited by examiner

*Primary Examiner* — Paul L Rodriguez
*Assistant Examiner* — Aniss Chad
(74) *Attorney, Agent, or Firm* — Staas & Halsey LLP

(57) ABSTRACT

A nonlinear technical product or process described by stochastic system output target values dependent on stochastic system input parameter values, thereby stating discrete technical system dependencies, is optimized by using a Response Surface Methods based on discrete technical system dependencies to generate at least one continuous auxiliary function for the real dependencies of the target values on the input parameter values. Next, an auxiliary function is used to generate at least one optimizing parameter for optimization by an objective function, thereby generating an additional discrete technical system dependence. The technical system is adaptively optimized by repeating the above, using the additional discrete technical system dependence, until the difference of successive optimized optimizing parameters is below a threshold. The final additional discrete technical system dependence is an optimal technical system operating point.

12 Claims, 4 Drawing Sheets

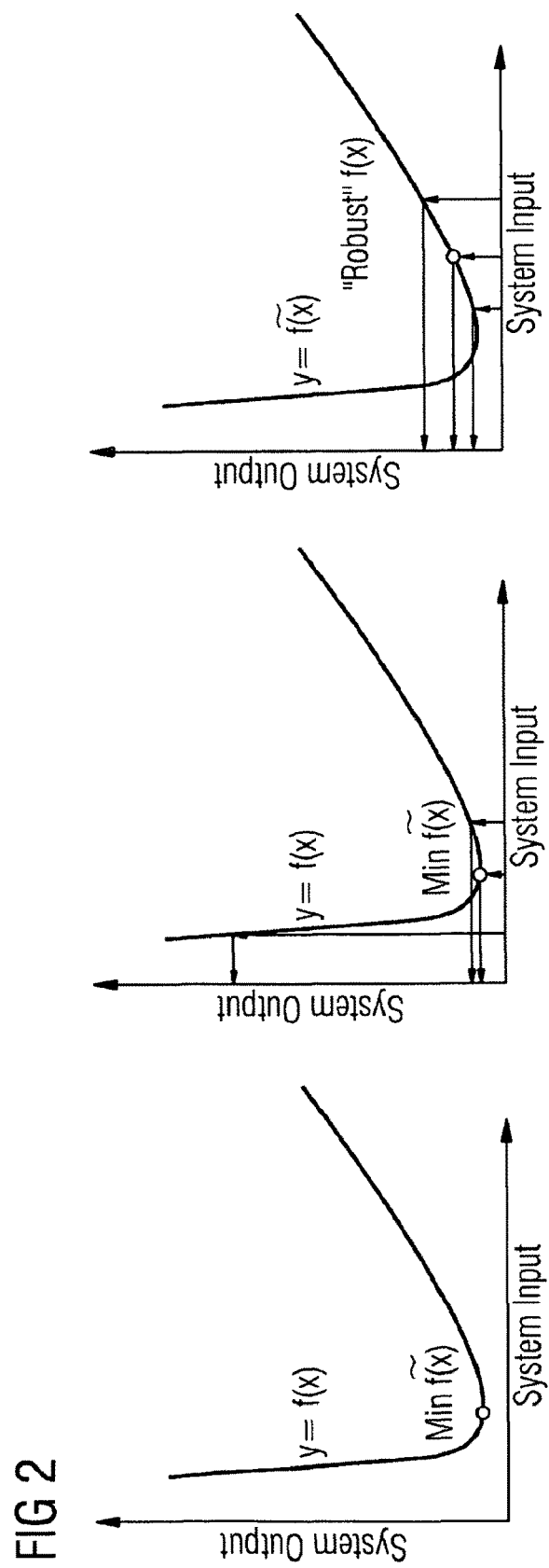

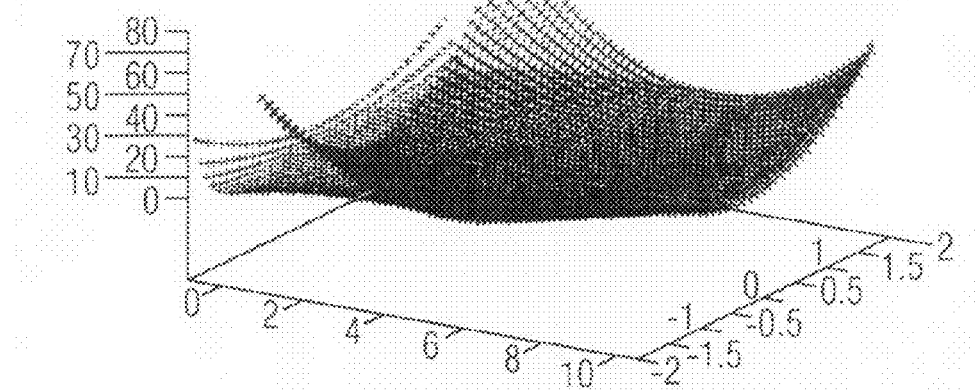
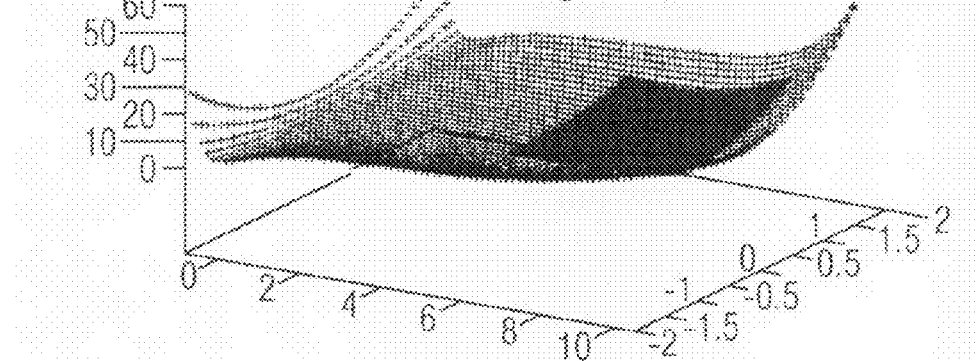
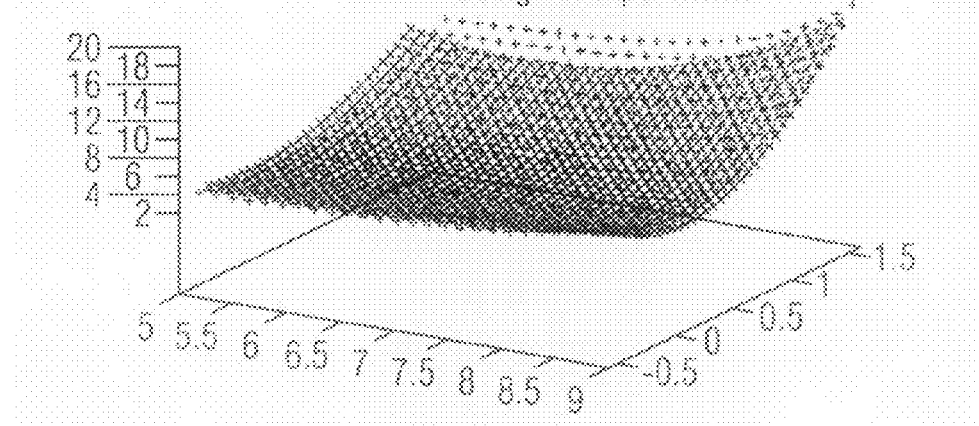
FIG 5

PROBABILISTIC DESIGN TOOL FOR OPTIMIZING A TECHNICAL SYSTEM

CROSS REFERENCE TO RELATED APPLICATIONS

This application is based on and hereby claims priority to European Application No. 05105786.7 filed on 29 Jun. 2005, the contents of which are hereby incorporated by reference.

BACKGROUND

It is already well known that tolerances of important influence factors must be taken into account for planning a technical system or a technical product. Conventionally high security margins are provided to take no risk respectively to take risks as low as possible for the planning of a system. This may lead to high fabrication and/or operation costs. For some special applications software packages do exist:

COMREL

COMREL is based is based on FORM/SORM and exists in two variants (FORM/SORM are first and second order reliability methods). COMREL is for reliability analysis of components. COMREL consists of two parts: COMREL-TI for time invariant and COMREL-TV for time variant reliability analysis. Base for both program parts is the method of first order (FORM) or second order (SORM). COMREL-TI can be supplied separately. COMREL-TV bases on COMREL-TI. COMREL uses two alternative, efficient and robust algorithms to find the so called beta-point (point for the local highest constraint or failure probability). The better-point is the base for the FORM/SORM method for a probability integration. Other options for probability integration are mean value first order (MVFO), Monte Carlo simulation, adaptive simulation, spheric simulation and several importance sampling schemata. 44 different probability distributions (univariate stochastic models) are useable. Arbitrary dependency structures can be generated with the aid of the Rosenblatt-transformation, the equivalent correlation coefficients according to Nataf, Der Kiuerghian or of the Hermite-models. Next to the reliability index importance values for all relevant input values are calculated: Global influence of the basis variables to the reliability index, sensitivities and elasticities, for the distribution parameters, the mean values and the standard deviations of the basis variables, sensitivities and elasticities for deterministic parameters in the constraint or failure function. Out of the sensitivity analysis partial security factors are deviated. Parameter studies can be performed for arbitrary values, e.g. for a distribution parameter, a correlation coefficient or a deterministic parameter. Basing on a parameter study charts of the reliability index, of the failure or of the survival probability, of the influences of basic variables or of deterministic parameters and of the expectancy value of a cost function can be generated. All results are available as a structured text file and as a file for the generation of plots. Charts generated in COMREL and formatted with the extensive plot options can be exported with the usual Windows equipment (Clipboard, Metafile, Bitmap). If it is necessary, a detailed outprint of provisional results for a failure search can be generated.

NESSUS

NESSUS (Numerical Evaluation of Stochastic Structures Under Stress) is an integrated finite element program with probabilistic load. Probabilistic load. Probabilistic sensitivities relating to μ and σ: FORM/SORM/FPI (fast probability integration), . . . connection to ANSYS, ABAQUS, DYNA3D. NESSUS is a modular computer software system for performing probabilistic analysis of structural/mechanical components and systems. NESSUS combines state of the art probabilistic algorithms with general-purpose numerical analysis methods to compute the probabilistic response and reliability of engineered systems. Uncertainty in loading, material properties, geometry, boundary conditions and initial conditions can be simulated. Many deterministic modeling tools can be used such as finite element, boundary element, hydrocodes, and user-defined Fortran subroutines.

DARWIN

DARWIN (Design Assessment of Reliability With Inspection)

This software integrates finite element stress analysis results, fracture-mechanics based life assessment for low-cycle fatigue, material anomaly data, probability of anomaly detection and inspection schedules to determine the probability of fracture of a rotor disc as a function of applied operating cycles. The program also indicates the regions of the disk most likely to fail, and the risk reduction associated with single and multiple inspections. This software will be enhanced to handle anomalies in cast/wrought and powder nickel disks and manufacturing and maintenance-induced surface defects in all disk materials in the near future.

The programs NESSUS, DARWIN and COMREL have a certain distribution in industry. All those programs merely concern mechanical reliability analyze. Finite element packages are integrated, in which stochastic is directly integrated. Thus the stochastic distribution of the load can directly be converted into the distributions of the displacements and a component part can be converted into risk zones by this. For elected, external finite element programs there exist interfaces at NESSUS and COMREL. DARWIN and COMREL moreover merely offer an instationary analysis. The process variables can be stochastic processes on a limited scale. Stochastic optimization, is not integrated within NESSUS, DARWIN and COMREL.

Nonlinear optimization algorithms cope with the problem:

$$\min_{\vec{x} \in R^n} f(\vec{x}), g(\vec{x}) \geq 0, \tag{1}$$

with $g(\vec{x})$ is a constraint, especially a failure, of an arbitrary value, the constraint or failure being caused by deterministic input parameters.

When $\vec{x}$ are no longer deterministic variables but stochastic random variables (e.g. normal distributed random variable $\vec{x} \in N(\vec{\mu}, \Sigma)$) the deterministic optimization problem (1) passes into the following probabilistic optimization problem:

$$\min_{\vec{x} \in N(\vec{\mu}, \Sigma)} E(f(\vec{x})), P(g(\vec{x}) \leq 0) \leq tol \tag{2}$$

I.e. the expectation value respectively mean value of the target size, $E(f(\vec{x}))$, is minimized and the constraints may be violated up to a prescribed tol. The mean values $\vec{\mu}$ of the input parameters are the design parameters. FIG. 1 illustrates the optimization problems (1) and (2). The deterministic optimization problem passes into the probabilistic optimization problem. When design variables respectively input parameters are afflicted with uncertainties the optional dimensioning of a technical system $y=f(\vec{x})$ leads to a new and different operating point. In other words minimizing the function $f(\vec{x})$ leads to results that are different from those obtained by minimizing the mean value of the function $f(\vec{x})$. This effect may be observed in FIG. 2. FIG. 2 shows an optimal dimensioning of the system $y=f(\vec{x})$, whereby an deterministic optimization is shown left, a representation of the constraint or the failure in case of a deterministic optimization is shown in the middle and a probabilistic optimization of the system is shown on the right.

A popular method for the computation of the response of a stochastic system is the Monte-Carlo method. The computation of the mean value and the variance of the system $y=f(\vec{x})$ is presented in the following Table:
Monte Carlo method:
START: Determine a set $\vec{x}_1, \ldots, \vec{x}_m$, which represents the distribution of the input parameter.

$$\text{ITERATE: } j = 1, 2, 3, \ldots, m$$
$$y_j = f(\vec{x}_j)$$
$$\text{END } j$$
$$\text{EVALUATE } E(Y) = \frac{1}{m} \sum_{1 \leq j \leq m} y_j$$
$$\text{EVALUATE } V(Y) = \frac{1}{m-1} \sum_{1 \leq j \leq m} (y_j - E(Y))^2$$

In order to assure a correct computation of the characteristic sizes E(Y) and V(Y), the size m of the ensemble must be very large. Hence, embedding the Monte-Carlo method into a framework of optimization is difficult in practical cases: To handle computational fluid dynamics or large Finite Element problems in reasonable time neither a super computer nor a large cluster of workstations would suffice.

SUMMARY

An aspect is to efficiently reduce costs for designing nonlinear technical systems, especially like technical products or technical processes. Especially optimized operating points of the technical systems should be easily and efficiently found in a short period of time. Especially computational fluid dynamics or large Finite Element problems should be handled in reasonable time. Accordingly the optimization of the system should be "time efficient", that is the necessary period of time for achieving an optimized result should be short in comparison with known methods, for example with the Monte-Carlo method.

The present method was developed in order to optimize nonlinear technical systems which are afflicted with uncertainties. Input parameters or model parameters of general technical systems may fluctuate, i.e. may have an underlying stochastic distribution. These uncertainties of the input parameters are carried over to the target values, which also have underlying stochastic distributions. A continuous auxiliary function is calculated on the base of these stochastic dependencies. Afterwards using the auxiliary function ($\tilde{f}_i(\vec{x})$; $\tilde{g}_i(\vec{x})$) at least one optimizing parameter ($E(\tilde{f}_i(\vec{x}))$; Var($\tilde{f}_i(\vec{x})$); $P(\tilde{g}_i(\vec{x}))$) is generated. An objective function is used for optimizing the optimizing parameter thereby generating a discrete technical system dependence ($\tilde{f}_i(\vec{x}_i)$; $\tilde{g}_i(\vec{x}_i)$). This dependence corresponds to an interpolation point. The newly generated interpolation point is used for making the stochastic dependencies more accurate by adding the interpolation point to the stochastic dependencies of the technical system. Again a continuous auxiliary function is calculated by interpolation to repeat the two step cycle. The cycle can be repeated until the difference of successive optimized optimizing parameters ($|E(\tilde{f}_i(\vec{x}_i))-E(\tilde{f}_{i+1}(\vec{x}_{i+1}))|$; $|\text{Var}(\tilde{f}_i(\vec{x}_i))-\text{Var}(\tilde{f}_{i+1}(\vec{x}_{i+1}))|$; $|P(\tilde{g}_i(\vec{x}_i))-P(\tilde{g}_{i+1}(\vec{x}_{i+1}))|$) is as low as desired. A thereto belonging last additional discrete technical system dependence ($\tilde{f}_p(\vec{x}_p)$; $\tilde{g}_p(\vec{x}_p)$) is useable as an optimal technical system operating point. Thus the technical system described by certain physical values (physical values of the nonlinear technical system can be length, area, volume, angle, time, frequency, velocity, acceleration, mass, density, force, moment, work, energy, power, pressure, tension, viscosity, and all further physical kinds of quantities) is optimized stochastically. For example $\tilde{f}_p(\vec{x}_p)$ is the transmitting power of a transmitter depending on the area and/or the align angle of an antenna. Knowing the method described herein, one skilled in the art is able to stochastically optimize arbitrary technical systems basing on technical and/or physical parameters without being inventive.

Alternative or cumulative objective functions may be used. On the contrary to the state of the art the present method is a stochastic optimizer allowing a common interface. In this case the present method does optimization without modeling. The focal point clearly lies on stochastic optimization.

An additional discrete technical system dependence ($\tilde{f}_i(\vec{x}_i)$; $\tilde{g}_i(\vec{x}_i)$) can be a base for an additional interpolation point being used for calculating a continuous auxiliary function with a higher accuracy than the precedent continuous auxiliary function. Repetition is performed by executing a first two step cycle (i=1) followed by a second two step cycle (i=2) followed by third two step cycle (i=3) and so on up to a last two step cycle with i=p. Accordingly i=1, 2, 3 . . . p or in other terms $\{i \in N/1, 2 \ldots p\}$.

According to the present method an improved approach is proposed. Basing on the present method optimizing the mean value and optimizing the variance of the target parameter are two efficient alternatives for objective functions. The objective function can be provided by optimizing the mean value ($E(f(\vec{x}))$) determined by the formula $$E(y) = \int_{R_z} [f^n(f(\vec{x})\rho(\vec{x})d\vec{x}) \quad (3)$$

and/or by optimizing the variance ($\text{Var}(f(\vec{x}))$) of the target value ($y=f(\vec{x})$) determined by the formula $$\text{Var}(y) = \int [f^n(f)\vec{x})-E(y))^2 \rho(\vec{x})d\vec{x}, \quad (4)$$

where $\rho(\vec{x})$ is a probabilistic density function of the input parameter distribution. The precedent integrals for the system $y=f(\vec{x})$ are calculated numerically. The efficient calculation of the mean value (expectation value) and of the variance of a system is discussed in the DE 10308314.6 "Statistische Analyse eines technischen Ausgangsparameters unter Berücksichtigung der Sensitivität" the content of which is hereby totally introduced into the disclosure of the present description.

According to an advantageous embodiment optimizing is performed by minimizing or maximizing the mean value ($E(f(\vec{x}))$) and/or minimizing the amount of the variance ($|\text{Var}(f(\vec{x}))|$) of the target value ($y=f(\vec{x})$).

According to another advantageous embodiment the objective function is alternatively or cumulatively provided by optimizing the input parameter ($\vec{x}$) tolerances ($\sigma_i$, i=1, ..., n), with the input parameter tolerances ($\sigma_i$) are especially maximized $$\left(\max_{\sigma_i, i=1,\ldots,n} \sum_{i=1}^{n} \sigma_i\right). \quad (5)$$

The calculation of the maximally allowed tolerances with the present method can provide efficient reductions of costs.

According to another advantageous embodiment optimizing is performed by additionally keeping a constraint like a failure probability $$(P(g(\vec{x}) \leq 0) = \int_{g(\vec{x}) \leq 0} \rho(\vec{x}) d\vec{x})) \quad (6)$$

of another value under or equal to a prescribed probability tolerance (tol), with $\rho(\vec{x})$ is a probabilistic density function of the input parameter distribution. Thus general nonlinear deterministic constraints may be added to the optimization problem. Accordingly the present method is capable to treat stochastic constraints. Hence, the present method can keep e.g. a constraint especially the failure probability in a mechanical system within a prescribed limit of tolerance. Keeping a constraint or failure probability under or equal to a prescribed probability tolerance (tol) means keeping a probability of differences to constraints ($P(g(\vec{x}) \leq 0)$) under or equal to a prescribed probability tolerance (tol). Constraints can be nonlinear deterministic and/or stochastic.

According to another advantageous embodiment the objective function is alternatively or cumulatively provided by optimizing, especially minimizing, a constraint or failure probability ($P(g(\vec{x}) \leq 0) = \int_{g(\vec{x}) \leq 0} \rho(\vec{x}) d\vec{x}$) of another value, with $\rho(\vec{x})$ is a probabilistic density function of the input parameter distribution According to the advantageous embodiment of mixed stochastic input parameters ($\vec{x}$) and deterministic input parameters ($\vec{x}_D$) in the formulas ($\vec{x}$) is substituted to ($\vec{x}, \vec{x}_D$) and/or a constraint like the failure of another value caused by the deterministic input parameters ($h(\vec{x}_D)$ is limited to $\leq 0$.

According to another advantageous embodiment optimizing is performed by using sensitivities $$\frac{\partial f}{\partial x_i}, i = 1, \ldots, n \quad (7)$$

of the target value ($y = f(\vec{x})$) with respect to the input parameters ($\vec{x}$). As for the deterministic optimization (1), the sensitivities with respect to the input variables are required. The efficient calculation of the mean value (expectation value) and of the variance of a system is discussed in the DE 10308314.6 "Statistische Analyse eines technischen Ausgangsparameters unter Berücksichtigung der Sensitivität" the content of which is again hereby totally introduced into the disclosure of the present description.

The present probabilistic optimizer method is able to treat with stochastic design variables with normal distributions and beta distributions for the design variables. Both distributions may be handled at the same time and the normal distributed variables may also be dependent. The normal distributed design variables have the density:

$$\rho(\vec{x}) = \frac{\sqrt{\text{Det}\Sigma}}{(\sqrt{2\pi})^n} \exp\left(-\frac{1}{2}(\vec{x}-\vec{\mu})^T \sum^{-1}(\vec{x}-\vec{\mu})\right) \quad (8)$$

The beta distributed design variables have the density:

$$\rho(\vec{x}) = \prod_{i=1}^{n} \frac{\Gamma(\alpha_i + \beta_i)}{\Gamma(\alpha_i)\Gamma(\beta_i)} x_i^{\alpha_i - 1}(1 - x_i)^{\beta_i - 1} \quad (9)$$

The beta distribution has the advantage that also asymmetric distributions and as a special case even the uniform distribution can be represented. If the input distributions are given in terms of discrete points, the parameters of the normal distribution may be identified by the Gauss-Newton algorithm.

According to another advantageous embodiment firstly a stochastic evaluating of the technical system is performed on the base of a nonlinear technical system function and of the density functions of the system input parameters $$\rho(\vec{x}) = \frac{\sqrt{\text{Det}\Sigma}}{(\sqrt{2\pi})^n} \exp\left(-\frac{1}{2}(\vec{x}-\vec{\mu})^T \Sigma^{-1}(\vec{x}-\vec{\mu})\right)$$

and/or $$\rho(\vec{x}) = \prod_{i=1}^{n} \frac{\Gamma(\alpha_i + \beta_i)}{\Gamma(\alpha_i)\Gamma(\beta_i)} x_i^{\alpha_i - 1}(1 - x_i)^{\beta_i - 1}$$

by calculating the mean value $E(y) = \int_{\mathbb{R}^n}(f(\vec{x})\rho(\vec{x})d\vec{x})$, the variance $\text{Var}(y) = \int_{\mathbb{R}^n}(f(\vec{x}) - E(y))^2 \rho(\vec{x}) d\vec{x}$, the density function and the cumulative density function of the technical system response. Different to deterministic analysis, here the sensitivities are required not only for the stochastic optimization, but also for the stochastic evaluation.

According to another advantageous embodiment in case of discrete distributed input parameters ($\vec{x}_j$ with j=1,2,3,...,m) and corresponding discrete target values ($y_j = f(\vec{x}_j)$), the following steps can be performed by generating of an nonlinear auxillary model for the technical product or the technical process, especially by an polynomial approximation to the discrete data; further by time efficient optimizing the technical system using one or more of the objective functions including a statistic representation, thereby generating an operating point of the nonlinear technical system. Especially "high dimensional" input parameters ($\vec{x}_j$), with j=1,2,3,..., m and for example with m≥20 (for "j" and "m" see the above described Monte-Carlo method) should be handled relatively rapidly for example in comparison with the Monte-Carlo method. Other possibilities are for example m≥30, m≥50, m≥100, m≥500, m≥1000 ....

According to another advantageous embodiment the input parameters ($\vec{x}$) satisfy common stochastical differential equations, whose density development is described by the Fokker-Plank equation.

According to further advantageous embodiments the Response Surface Methods are the Hermite, the Laguerre, the Legendre and/or the Jacobi approximation. Other methods are also possible.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 2 shows graphs for a comparison of the known deterministic optimization problem with the probabilistic optimization problem described below;

FIG. 5 shows graphs for a second order polynomial approximation to discrete stochastic data;

DETAILED DESCRIPTION OF THE PREFERRED EMBODIMENT

Figure 1:
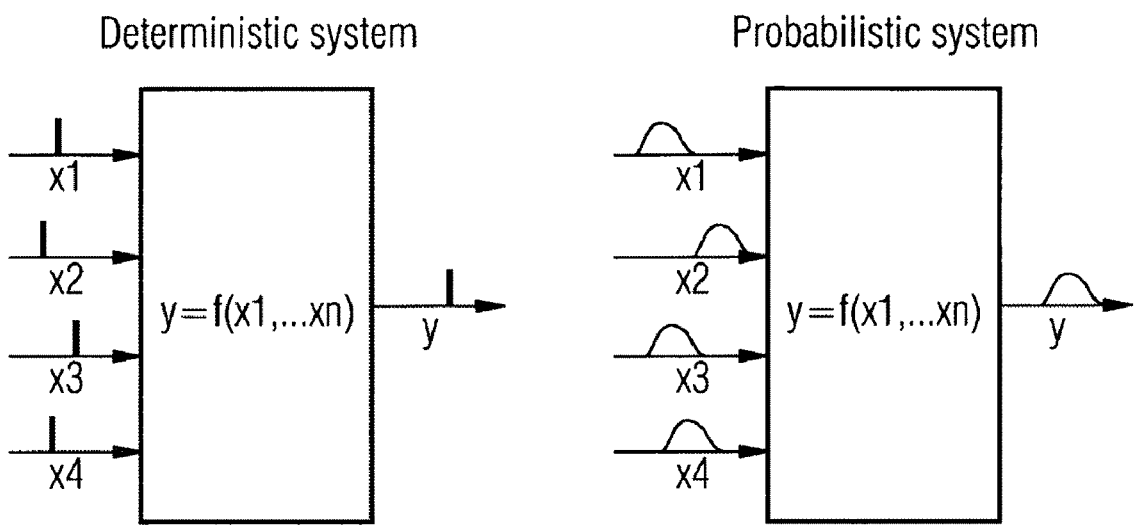
FIG. 1 shows block diagrams for a comparison of a known deterministic system with a probabilistic system.

Reference will now be made in detail to the preferred embodiments, examples of which are illustrated in the accompanying drawings, wherein like reference numerals refer to like elements throughout.

Figure 3:
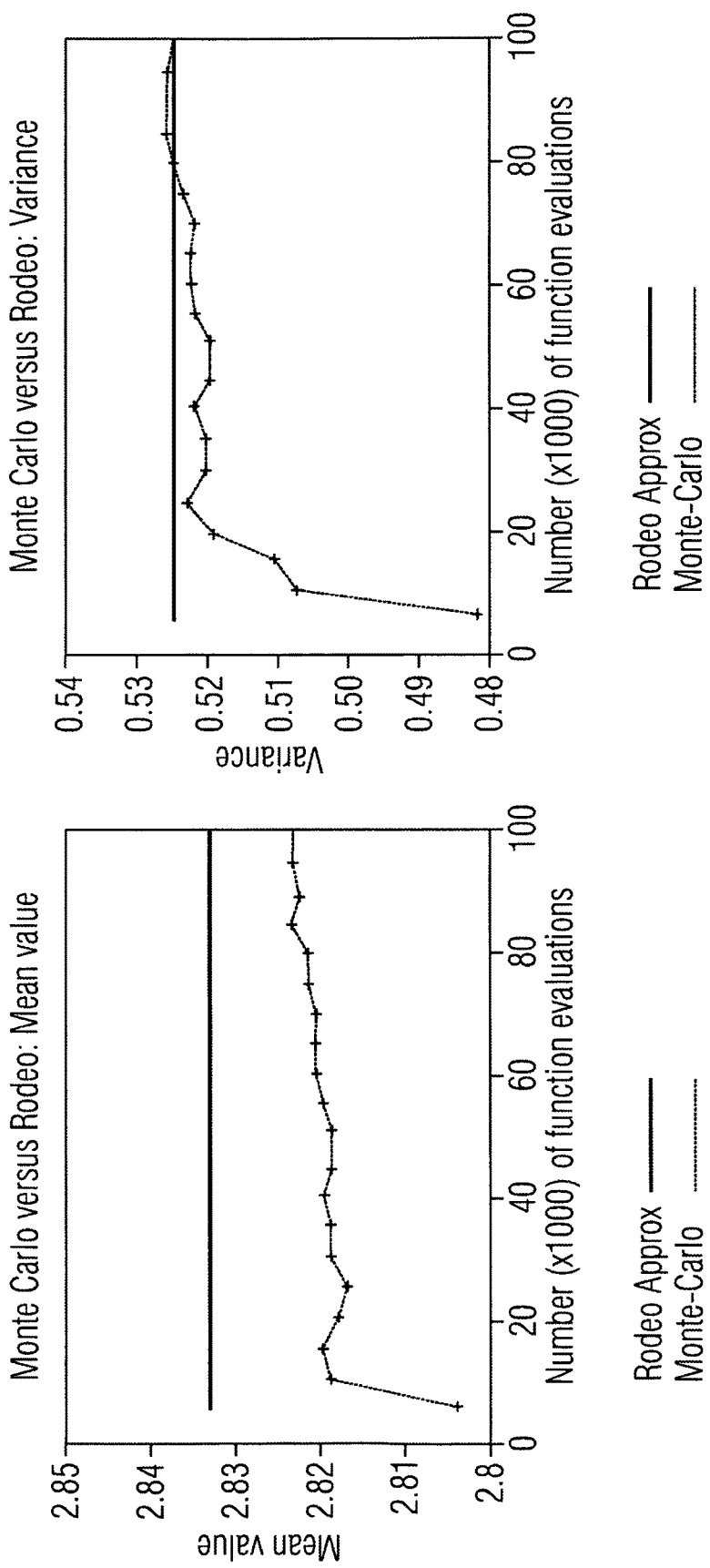
FIG. 3 shows graphs for a comparison of the conventional Monte-Carlo evaluation with the approximations according to the method described below.

The difference of the present method approximates and the Monte-Carlo evaluations may be observed in FIG. 3.

Probabilistic Design Goals

The deterministic optimization problem (1) determines the optimal operation point. When changing the probabilistic design parameters some Six Sigma relevant goals respectively probabilistic design goals can be achieved which could be treated by the present probabilistic optimizer method. According to the used objective function(s) the following embodiments for optimization goals can be achieved:

1. Stochastic evaluation of nonlinear systems: Given a general non-linear system and the density functions of the system input parameters, the present method is able to compute the stochastic response of the system without any Monte-Carlo evaluation. To be concrete, the mean value, the variance, the density function and the cumulative density function of the system response may be computed. Thus, parametric studies of the system may be performed.

2. Probabilistic optimization: The mean value of the system $y=f(\vec{x})$ is minimized. Additionally, another value could be limited to a given probability (constraint or failure probability).

$$\min_{\vec{x} \in N(\vec{\mu}, \Sigma)} E(f(\vec{x})), P(g(\vec{x}) \leq 0) \leq tol \qquad (10)$$

3. Robust design: The variance of the system $y=f(\vec{x})$ is minimized. That is, the system is shifted into states, which are not sensitive with respect to perturbations of the input parameters. Additionally, another value could be limited to a given probability (constraint or failure probability).

$$\min_{\vec{x} \in N(\vec{\mu}, \Sigma)} \text{Var}(f(\vec{x})), P(g(\vec{x}) \leq 0) \leq tol \qquad (11)$$

4. Robust design optimization: Any combination of the preceding cases may be optimized:

$$\min_{\vec{x} \in N(\vec{\mu}, \Sigma)} \alpha E(f(\vec{x})) + \beta \text{Var}(f(\vec{x})), P(g(\vec{x}) \leq 0) \leq tol \qquad (12)$$

Figure 4:
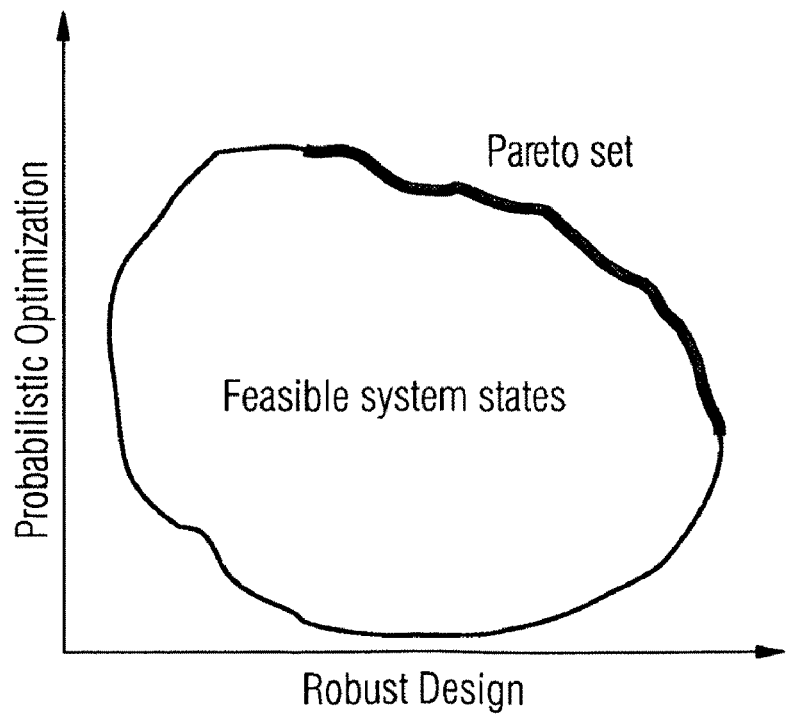
FIG. 4 is a graph of a pareto set of two objectives.

The variables "$\alpha$" and "$\beta$" are weighting factors for weighting the mean value and the variance. Looking for a robust operation point and looking for a probabilistic optimal operating point may be competing targets. Therefore, all combinations of the weighted sum (12) may be reasonable. In a further embodiment of the present method, the Pareto set of the two objectives is computed, see FIG. 4. FIG. 4 shows the computing the pareto set of probabilistic optimality (maxE(f($\vec{x}$))) and robustness (max-Var(f($\vec{x}$))).

5. Minimization of constraint or failure probability: In many cases, it makes sense to minimize the failure probability directly (instead of limiting failure probability by a given value).

$$\min_{\vec{x} \in N(\vec{\mu}, \Sigma)} P(g(\vec{x}) \leq 0) \qquad (13)$$

Constraints can be also optimized by maximizing a constraint probability.

6. Maximization of input tolerances: Questions of cost lead to the following problem: How inaccurate may a system or product be produced while keeping its constraint or failure probability within a given tolerance? Let $\vec{x}$ be independent random variables, e.g. $\vec{x} \in N(\vec{\mu}, \text{diag}(\sigma_1, \ldots \sigma_n))$.

The question is how large the variances $\sigma_i$, i=1, ..., n may be chosen while keeping the constraint or failure probability within a given tolerance.

$$\max_{\sigma_i, i=1,\ldots,n} \sum_{i=1}^{n} \sigma_i, P(g(\vec{x}) \leq 0) \leq tol \qquad (14)$$

7. Mixed deterministic and probabilistic Design variables: Modeling technical systems often deterministic and probabilistic design variables arise at the same time. The optimization problem (11) then becomes:

$$\min_{(x_D, \vec{x}) \in (N(\vec{\mu}, \Sigma), \mathcal{R}^n)} \alpha E(f(\vec{x}, \vec{x}_D)) + \beta \text{Var}(f(\vec{x}, \vec{x}_D)) \qquad (15)$$
$$P(g(\vec{x}, \vec{x}_D) \leq 0) \leq tol$$
$$h(\vec{x}_D) \leq 0$$

The present method is able to treat the above optimization problem (15). The variables "$\alpha$" and "$\beta$" are weighting factors for weighting the mean value and the variance. The density function and the accumulated density function of system output $y=f(\vec{x})$ are calculated numerically in every case. The stochastic sensitivities, that is, the derivatives of the output moments with respect to the input moments are a byproduct of optimization. They are available in every state of the system. Point (1)-(7) suggest, that the system input must be normal distributed $(\vec{x}) \in (N(\vec{\mu}, \Sigma))$. The present method is able to treat also with mixed normal and beta distributions.

Highlights of the present method are especially:
the multi critical optimization of robustness and stochastical optimality.
and the maximization of tolerance of the process parameters respectively of the input parameters at predetermined limiting of the reliability probability.

Basing on the present method also instationary analysis should be performed. Therewith the process variable respectively the input variable can satisfy common stochastical differential equations, whose density development is described by the Fokker-Planck equation. An instationary optimization, e.g. the optimization of the period of life, is not known by the state of the art.

Design of Experiments (DOE)

It may happen, that no physical model is available for a complicated process. In this case, the present method is able to construct a auxiliary model from discrete date of the system. With this auxiliary model, all the analysis of the present method, given in the last section may be performed. Of course the validity of such a model is only given in a small range. To demonstrate this, a comparison of the nonlinear model with the auxiliary model is given.

Consider a very simple nonlinear model is given by $$f(x, y) = (\exp(-3*x) + 2*\arctan(x) + \exp(8-c))*(y*y+1) \quad (16)$$

X and Y are normal distributed random variables with $$\mu_1 = E(X) = 7.0, \mu_2 = E(Y) = 0.5, \Sigma = \begin{pmatrix} 0.5 & 0.01 \\ 0.01 & 0.1 \end{pmatrix} \quad (17)$$

A stochastic analysis by RODEO gives the corresponding mean value of the nonlinear system:

$$E(f(x, y)) = 4.47 \quad (18)$$

Now we want to minimize the system f(x, y) in the stochastical sense.

In a first step a deterministic optimization is performed:

$$\min_{x,y} f(x, y) \quad (19)$$

leads to the values $$x=0.14, y=0.0, f(x, y)=0.93, E(f(x, y))=2.37 \quad (20)$$

Using stochastic optimization by the present method, see last sections, $$\min_{\mu_1, \mu_2} E(f(x, y)) \quad (21)$$

leads to the values $$\mu_1=0.6, \mu_2 0.0, f(x, y)=1.25, E(f(x, y))=1.42 \quad (22)$$

First we could state that stochastic optimization results in a higher deterministic value (f(x, y)=1.25) but in a much smaller stochastic value E(f(x, y))=1. 42).

In the next step, we assume that we have no longer a nonlinear model but discrete normal distributed values (17) and additionally the discrete corresponding system response. With a random generator normal distributed values are generated in the range of $(x, y) \in [5:95] \times [-0.4; 1,4]$. The present method is able to fit an auxiliary model to this data. FIG. 5 shows a second order polynomial approximation of the data. FIG. 5 presents a nonlinear model according to (16) versus a fitted auxiliary model from discrete data. Upper diagram shows that the quadric approximation becomes bad for values $x \leq 5$. Middle diagram shows a good approximation in the range (x,y) are elements of $[5:9.5] \times [-0.4:1.4]$. The lower diagram shows a zoom into the range (x,y) are elements of $[5:9.5] \times [-0.4:1.4]$.

Also with this model, the present method is able to improve the operating point.

Stochastic minimization of the mean value leads to $$\mu_1=5.7, \mu_2=0.0, E(f(x, y))=3.2 \quad (23)$$

which is an improvement to (18).

Applications of the Present Method

To sum up Design For Six Sigma (DFSS) or probabilistic design is a task of ongoing interest when manufacturing products or controlling processes. These methodologies try to analyze in which way uncertainties of the design parameter influence the system response and try to improve the system or product. The present probabilistic optimizer method is designed to support the goals of Six Sigma, see section "probabilistic design goals". There are two main applications of the present method:

Many technical processes in the field of aerodynamics, electromagnetics and structural mechanics can be simulated by software packages, which may be distributed commercially. Depending on the discretization and the method itself much computation time is used to solve these problems. The present method is designed to treat with these problems by avoiding expensive Monte-Carlo evaluations.

For many processes no physical model is available. Only measurements of the design parameter and the process response define the process. The present method is able to construct an auxiliary model by using polynomial approximation (DOE). With this pseudo-model all the analysis given in section "probabilistic design goals" may be performed.

Generally the present method was developed to optimize systems or products whose influence parameters fluctuate. Optimizing can mean, that the system or product is provided as robust as possible or are provided as optimal as possible in a probabilistic sense.

Many technical processes (error dynamic, electromagnetism or structural mechanic) can be simulated by commercially distributed software packets. These software packages can be coupled with the present method to optimize in a probabilistic sense predetermined goals like aerodynamic efficiency, electromagnetic emission behavior or mechanical stability.

For many complicated processes no models exist. In these cases with RODEO a data based optimizing can be performed.

In the following possible applications for the present method are shown. These are merely examples. The actual application range for the present method is much greater.

1. An airline wants to reduce its delays. Firstly possible influence factors are determined like for example desk time, baggage dispatch, start slots etc. On many subsequently following days data of these influence factors and of the resulting delays are collected. The present method locates the greatest influence factors and performs a data based optimizing (see section "design of experiments").

2. The weight of a product should be minimized, the mechanical stability should be not lower than a given limit. The wall thicknesses of the product do fluctuate, since the rolling machines merely guarantee a certain accuracy. Therewith the weight of a product also varies and the mechanical stability merely can be provided with a predetermined probability. The mechanical stability can be calculated with a finite-element-package. The present method calculates the minimal expectation value respectively minimal mean value of the weight (see section "probabilistic design goals" item 2.

3. Many technical apparatuses and measuring devices must fulfill predetermined accuracy predeterminations. Many influence factors and their variability lead to the end accuracy. First the present method locates the most important influence factors in view of the end accuracy. Second the variability (inaccuracies) of the single influence factors can be maximized with the target, that the end accuracy keeps the demanded value (see section "probabilistic design goals" item 6).

4. The operating point of a plant should be determined. On the one hand the operating point should be optimal relating to one criterion, on the other hand the plant should be insensitive to fluctuations of the influence factors. The present method calculates the Pareto set out of probabilistic optimality and robustness of the plant. Basing on this the applicant can decide by himself which compromise of optimality and robustness he elects (see section "probabilistic design goals" item 4).

5. The crash behavior of a car is investigated. It is demanded that the negative acceleration of a dummy does not exceed a certain value. An essential influence factor is the sheet metal thickness, which is a random variable because of the inaccuracy of the rolling machines. Now it is a demand, that the expectancy value of the sheet metal thickness is as small as possible, but the negative acceleration should not exceed a certain value with a pre-given probability. There exists a known method for the simulation of the crash behavior, the known method can be coupled with the present method (see section "probabilistic design goals" item 2).

A further example for a nonlinear technical system may be an antenna configuration, whereby an input parameter is the length of the transmitter part and a target value is the transmitting power.

The present method is not limited by the application examples stated above. The examples are merely seen as possible embodiments of the present method.

The present method uses mathematical formulas, which are practically utilized, to improve all kind of nonlinear values of the nonlinear technical system can be length, area, volume, angle, time, frequency, velocity, acceleration, mass, density, force, moment, work, energy, power, pressure, tension, viscosity, and all further physical kinds of quantities-technical systems. Input parameters and/or target (see "Taschenbuch der Physik", Kuchling, Verlag Harri Deutsch, Thun and Frankfurt/Main, 1985, chapter 3.6.). Examples for technical systems are transport like cars or airplanes, electronic circuits, power stations, phones, turbines, antennas, fabrication processes of all industrial goods and so on. In all cases input parameters and target values are identified and used for optimizing. An improvement takes place especially in comparison with conventional design.

An embodiment for the present method is a certain software named "RODEO" standing for "robust design optimizer". According to the method for optimization of technical systems with uncertainties an optimization model is proposed which uses a target function including the expectancy value $E(y)$ of the technical system $y=f(\vec{x})$ or the variance $Var(y)$ or a combination of both values. A possible constraint can be used in the proposed optimization model and can be a failure probability $P_f$ being hold within a given tolerance. Expectancy value $E(y)$ and $Var(y)$ are given by formulas $$E(y)=\int f(\vec{x})\rho(\vec{x})d\vec{x} \quad (3)$$

$$Var(y)=\int (f(\vec{x})-E(y))^2 p(\vec{x})d\vec{x} \quad (4).$$

The failure probability is given by formula $$P_f = P(g(\vec{x}) \leq 0) = \int_{g(\vec{x})\leq 0} p(\vec{x})d\vec{x}. \quad (6)$$

The integrals in equations (3), (4) and (6) usually can not be analytically calculated. The overall method to solve the optimization model can be merely efficient, in case the integral calculating methods are efficient. Therefore used methods are subsequently described.

Methods for Calculating Expectancy Value and Variance

The used methods belong to the class of so called Response Surface methods. Specifically two variants can be used:
Taylor approximation
Hermite approximation Using the taylor approximation the function $f(\vec{x})$ is squarely developed:

$$f(\vec{x}) \cong f_T(\vec{x}) = f(\vec{\mu}) + \nabla f(\vec{\mu})^T(\vec{x}-\vec{\mu}) + \frac{1}{2}(\vec{x}-\vec{\mu})^T \nabla^2 f(\vec{\mu})(\vec{x}-\vec{\mu}) \quad (7)$$

and the approximation $f_T(\vec{x})$ is inserted into equation (3) respectively (4):

$$E(y)\cong\int f_T(\vec{x})\rho(\vec{x})d\vec{x} \quad (8)$$

$$Var(y)\cong\int (f_T(\vec{x})-E(y))^2 p(\vec{x})d\vec{x} \quad (9).$$

The integral in (8) and (9) can be exactly calculated now.

A higher approximation accuracy is achieved by a Hermite approximation. $y=f(\vec{x})$ is approximated by a Hermite approach of second order:

$$f_H(\vec{x}) = a_0 H_0(\vec{x}) + \sum_{i=1}^{n} a_{1i} H_{1i}(\vec{x}) + \sum_{i=1}^{n}\sum_{j=1}^{n} a_{2ij} H_{2ij}(\vec{x}). \quad (10)$$

Herewith the Hermite polynomials are given by $$H_0(\vec{x})=1, H_{1i}(\vec{x})=x_i, H_{2ij}(\vec{x})=x_i x_j - \delta_{ij}.$$

By inserting of $f_H(\vec{x})$ instead of $f(\vec{x})$ in (3) respectively (4) an approximation of expectancy value respectively variance is achieved likely to the Taylor approximation. The coefficients in (10) are calculated for example by solving the following least square problem:

$$\min_{a_0, a_{1i}, a_{2ij}} \sum_{k=1}^{p} (f_H(\vec{x}^k) - f(\vec{x}^k)) \quad (11)$$

for given interpolation points (evaluation places) $\vec{x}^k$. Since functional evaluations are expensive an adaptive method is used. Therewith firstly starting with only few interpolation points and adaptively adding further interpolation points as long as the approximation of expectancy value respectively variance results in amendments. The adaptive optimizing method generates further advantages such that by the first optimizing steps the integrals can be calculated with a low accuracy but should be more accurate close to the solution point. For high dimension problems the accuracy of the integral approximation can be also adaptively fitted.

Method for Calculating the Failure Probability

For an easy representation it is assumed that the random variables are independent and standard normal distributed. The methods are also useable with a common case. Merely a transformation must be executed before.

By a first step a point $\vec{x}*$ of the highest failure probability, a so called beta point is determined. This point is resulting from the solution of the following optimizing problem:

$$\min \|\vec{x}\|^2$$

relating to (12)

$$g(\vec{x}) \leq 0.$$

Two variants for calculating the integrals in (6) are used:
Linear approximation
Hermite approximation.

Being $\vec{x}*$ the solution of (10) (beta point) and $\beta = \|\vec{x}\|$. By the linear approximation (FORM: "first order reliability method") $g(\vec{x})$ is approximated by $$g(\vec{x}) \approx a^T (\vec{x} - \vec{x}*).$$

Accordingly the following approximation for $P_f$ is generated:

$$P_f \approx \phi(-\beta)$$

whereby $\phi$ is the distribution function of the standard normal distribution.

A higher accuracy is achieved by using the Hermite approximation $g_H(\vec{x})$ of the function $g(\vec{x})$ close to the beta point. Likely to the approach (10) the following equation is achieved:

$$g_H(\vec{x}) = a_0 H_0(\vec{x}) + \sum_{i=1}^{n} a_{1i} H_{1i}(\vec{x}) + \sum_{i=1}^{n} \sum_{j=1}^{n} a_{2ij} H_{2ij}(\vec{x}). \tag{13}$$

The coefficients are also determined by the least square problem (11). To evaluate the quality of the approximation the beta point $\vec{x}_H*$ relating to the Hermite approximation is determined. The beta point $\vec{x}_H*$ results from the solution of the following optimizing problem:

$$\min \|\vec{x}\|^2$$

relating to (14).

$$g_H(\vec{x}) \leq 0.$$

Again an adaptive method is applied. Interpolation points are added as long as $\vec{x}_H*$ and the main curvatures in $\vec{x}_H*$ do amend. For evaluating the failure probability $P_f$ the integral in (6) is transformed into:

$$P_f = \int_{g(\vec{x}) \leq 0} \rho(\vec{x}) d\vec{x} = \int \Gamma_g \frac{\rho(\vec{x})}{\rho(\vec{x} - \vec{\beta})} \rho(\vec{x} - \vec{\beta}) d\vec{x} \tag{15}$$

thereby $\Gamma_g$ is the indicator function of $g(\vec{x})$:

$$\Gamma_g = \begin{cases} 0 & g(\vec{x}) > 0 \\ 1 & g(\vec{x}) \leq 0 \end{cases}$$

The approximation of $P_f$ is $$P_f \approx \int_{g(\vec{x}) \leq 0} \rho(\vec{x}) d\vec{x} = \int \Gamma_{g_H} \frac{\rho(\vec{x})}{\rho(\vec{x} - \vec{\beta})} \rho(\vec{x} - \vec{\beta}) d\vec{x}. \tag{16}$$

The integral in (16) can be efficiently calculated for example by "importance sampling".

Monte Carlo methods are usable merely for small systems. For optimizing problems they are not usable at all. "Standard" Response Surface methods (it means without adapting) are also still to large-scale, at least for optimizing problems.

By using adaptive Response Surface Methods efficient methods also for complex optimization tasks with technical pertinent target functions (see above) and "chance constraints" (failure probability) being constraints are achieved. The adapting can be performed by two steps:

Adapting with the functional evaluation. The function is adaptively interpolated (evaluated) at further points (places), until a pre given accuracy of the target function respectively of the constraint is achieved.

Adapting with the optimizing. At the first optimization steps merely a low accuracy is necessary.

Using the adapting a given tolerance is achieved by minimal efforts.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A non-transitory computer-readable medium encoded with a computer program for optimizing a technical system that is a nonlinear technical product or process, the program when executed by a computer causes the computer to perform a method comprising:

describing the technical system by stochastic system output target values dependent on stochastic system input parameter values, thereby stating discrete technical system dependencies;

using Response Surface Methods based on the discrete technical system dependencies to generate at least one continuous auxiliary function $\tilde{f}_i(\vec{x})$; $\tilde{g}_i(\vec{x})$) for real dependencies of target values on the input parameter values (y=f($\vec{x}$); z=g($\vec{x}$));

using an auxiliary function ($\tilde{f}_i(\vec{x})$; $\tilde{g}_i(\vec{x})$) to generate at least one optimizing parameter (E($\tilde{f}_i(\vec{x})$); Var($\tilde{f}_i(\vec{x})$); P($\tilde{g}_i(\vec{x})$)) optimized by an objective function, thereby generating an additional discrete technical system dependence ($\tilde{f}_i(\vec{x}_i)$; $\tilde{g}_i(\vec{x}_i)$); and repeating both of said using operations to adaptively optimize the technical system, respectively additionally using the additional discrete technical system dependence ($\tilde{f}_i(\vec{x}_i)$; $\tilde{g}_i(\vec{x}_i)$), until a difference of successive optimized optimizing parameters (|E($\tilde{f}_i(\vec{x}_i)$)−E($\tilde{f}_{i+1}(\vec{x}_{i+1})$)|; |Var($\tilde{f}_i(\vec{x})$)−Var($\tilde{f}_{i+1}(\vec{x}_{ni})$)|; |P($\tilde{g}_i(\vec{x})$)−P($\tilde{g}_{i+1}(\vec{x}_{ni})$)|) is as low as desired and a final additional discrete technical system dependence ($\tilde{f}_p(\vec{x})$; $\tilde{g}_p(\vec{x})$) is useable as an optimal technical system operating point, wherein the optimizing parameter includes at least one of a mean value (E($\tilde{f}(\vec{x})$)) determined by E($\tilde{f}(\vec{x})$)=∫L''($\tilde{f}(\vec{x})$)ρ($\vec{x}$)d$\vec{x}$, and a variance (Var($\tilde{f}(\vec{x})$)) determined by Var(y)=∫L''($\tilde{f}(\vec{x})$−E($\tilde{f}(\vec{x})$))$^2$ρ($\vec{x}$)d$\vec{x}$, where ρ($\vec{x}$) is a probabilistic density function of an input parameter distribution.

2. A method according to claim 1, wherein the objective function is provided by minimizing or maximizing the mean value (E($\tilde{f}(\vec{x})$)) and/or minimizing of the variance (Var($\tilde{f}(\vec{x})$)).

3. A method according to claim 2, wherein the objective function is alternatively or cumulatively provided by maximizing optimizing parameters which are input parameter tolerances $$\left( \max_{\sigma_i, j=1,\dots,n} \sum_{i=1}^{n} \sigma_i \right)$$

and taking into account at least one constraint (P($\tilde{g}(\vec{x})$≦0)).

4. A method according to claim 2, wherein the objective function is alternatively or cumulatively provided by keeping an optimizing parameter which is a failure probability (P($\tilde{g}(\vec{x})$≦0)) of at least one of another value, and the target value (P($\tilde{f}(\vec{x})$≦0)), under or equal to a prescribed probability tolerance, with P($\tilde{g}(\vec{x})$≦0)=∫$_{\tilde{g}(\vec{x}_{bw})≦0}$ρ($\vec{x}$)d$\vec{x}$ and with ρ($\vec{x}$) a probabilistic density function of the input parameter distribution.

5. A method according to claim 2, wherein the objective function is alternatively or cumulatively provided by minimizing a failure probability (P($\tilde{g}(\vec{x})$≦0)) of at least one of another value and the target value (P($\tilde{f}(\vec{x})$≦0)) with P($\tilde{g}(\vec{x})$≦0)=∫$_{\tilde{g}(\vec{x}_{bw})≦0}$ρ($\vec{x}$)d$\vec{x}$ and with ρ($\vec{x}$) a probabilistic density function of the input parameter distribution.

6. A method according to claim 5, wherein for mixed stochastic input parameters ($\vec{x}$) and deterministic input parameters ($\vec{x}_{o_D}$) a constraint depends on the deterministic input parameters (h($\vec{x}_{o_D}$)≦0).

7. A method according to claim 6, wherein the objective is provided by using stochastic sensitivities of the optimizing parameters (E($\tilde{f}(\vec{x})$); Var($\tilde{f}(\vec{x})$); P($\tilde{g}(\vec{x})$)).

8. A method according to claim 7, wherein normal distributed input parameters ($\vec{x}$) form the probabilistic density function:

$$\rho(\vec{x}) = \frac{\sqrt{Det\Sigma}}{(\sqrt{2\pi})^n} \exp\left(-\frac{1}{2}(\vec{x}-\vec{\mu})^T \Sigma^{-1} (\vec{x}-\vec{\mu})\right)$$

and/or beta distributed input parameters ($\vec{x}$) comprise the probabilistic density function:

$$\rho(\vec{x}) = \prod_{i=1}^{n} \frac{\Gamma(\alpha_i+\beta_i)}{\Gamma(\alpha_i)\Gamma\beta_i} x_i^{\alpha_i-1}(1-x_i)^{\beta_i-1}.$$

9. A method according to claim 8, wherein the objective function is provided by additionally or cumulatively using the cumulative density function (∫L''($\tilde{f}(\vec{x})$)d$\vec{x}$) of the technical system response.

10. A method according to claim 9, further comprising generating the auxiliary function ($\tilde{f}(\vec{x})$; $\tilde{g}(\vec{x})$) on based on discrete input parameter values ($\vec{x}_i$) and discrete target values (y$_i$=f($\vec{x}_i$)).

11. A method according to claim 10, wherein concerning changes of the input parameters depending on time (Δ$\vec{x}$(t)) the input parameters ($\vec{x}$) satisfy common stochastical differential equations, whose density development is described by the Fokker-Plank equation.

12. A method according to claim 11, wherein the Response Surface Methods are at least on of a Hermite, Laguerre, Legendre and Jacobi approximation.

* * * * *